United States Patent
Wei et al.

(10) Patent No.: US 11,157,365 B2
(45) Date of Patent: Oct. 26, 2021

(54) METHOD FOR PROCESSING STRIPE IN STORAGE DEVICE AND STORAGE DEVICE

(71) Applicant: Huawei Technologies Co., Ltd., Shenzhen (CN)

(72) Inventors: Mingchang Wei, Shenzhen (CN); Suhong Wu, Shenzhen (CN); Guoyan Huang, Shenzhen (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 108 days.

(21) Appl. No.: 15/956,063

(22) Filed: Apr. 18, 2018

(65) Prior Publication Data

US 2018/0239671 A1    Aug. 23, 2018

Related U.S. Application Data

(63) Continuation of application No. PCT/CN2016/078693, filed on Apr. 7, 2016.

(51) Int. Cl.
*G06F 11/10* (2006.01)
*G06F 12/00* (2006.01)
(Continued)

(52) U.S. Cl.
CPC .......... *G06F 11/108* (2013.01); *G06F 3/0619* (2013.01); *G06F 3/0647* (2013.01);
(Continued)

(58) Field of Classification Search
CPC ............. G06F 11/1076; G06F 11/1096; G06F 12/0253; G06F 2212/1032;
(Continued)

(56) References Cited

U.S. PATENT DOCUMENTS 9,158,670 B1 *  10/2015  Kang ................... G06F 3/0608
2009/0204846 A1   8/2009  Baloun
(Continued)

FOREIGN PATENT DOCUMENTS

CN    103135946 A    6/2013
CN    103577338 A    2/2014
(Continued)

OTHER PUBLICATIONS

Qing, L, "RAID5 Disk Array Data Recovery," Journal of Chinese New Communications, Oct. 2013, 2 pages.
(Continued)

*Primary Examiner* — Bryce P Bonzo
*Assistant Examiner* — Michael Xu
(74) *Attorney, Agent, or Firm* — Conley Rose, P.C.

(57) ABSTRACT

A solution for processing a stripe in a storage device is provided. Where at least one stripe unit not requiring garbage collection from each stripe of at least two stripes in the storage device is determined, each of the at least two stripes comprises a stripe unit requiring garbage collection and a stripe unit not requiring garbage collection; parity data of data in the determined stripe units not requiring garbage collection is computed and stored into a first idle stripe unit, where the first idle stripe unit and the determined stripe units not requiring garbage collection are in a new stripe in the storage device.

20 Claims, 2 Drawing Sheets

(51) Int. Cl.
*G06F 3/06* (2006.01)
*G06F 12/02* (2006.01)

(52) U.S. Cl.
CPC .......... *G06F 3/0688* (2013.01); *G06F 3/0689* (2013.01); *G06F 12/00* (2013.01); *G06F 12/0246* (2013.01); *G06F 12/0253* (2013.01); *G06F 2212/7205* (2013.01)

(58) Field of Classification Search
CPC ......... G06F 2212/262; G06F 2212/403; G06F 3/0604; G06F 3/0605; G06F 3/0619; G06F 3/0634; G06F 3/0647; G06F 3/0652; G06F 3/0659; G06F 3/0673; G06F 3/0689
See application file for complete search history.

(56) References Cited

U.S. PATENT DOCUMENTS

| | | | |
|---|---|---|---|
| 2014/0181432 A1* | 6/2014 | Horn | G06F 12/0871 711/159 |
| 2015/0205670 A1* | 7/2015 | Bonwick | G06F 3/0605 714/766 |
| 2016/0011815 A1* | 1/2016 | Klein | G06F 12/0246 714/6.12 |
| 2016/0034341 A1* | 2/2016 | Ojalvo | G06F 3/0619 714/770 |
| 2016/0117112 A1* | 4/2016 | Tomlin | G06F 3/0685 711/103 |
| 2016/0132429 A1 | 5/2016 | Lin | |
| 2016/0217038 A1 | 7/2016 | Bonwick | |
| 2017/0139768 A1* | 5/2017 | Camp | G06F 3/0655 |
| 2017/0177235 A1* | 6/2017 | Nishikubo | G06F 3/0656 |
| 2019/0042405 A1* | 2/2019 | Boyle | G06F 12/0253 |

FOREIGN PATENT DOCUMENTS

| | | |
|---|---|---|
| CN | 103902465 A | 7/2014 |
| CN | 104794070 A | 7/2015 |
| CN | 104809032 A | 7/2015 |

OTHER PUBLICATIONS

English Translation of Qing, L., "RAID5 Disk Array Data Recovery," Journal of Chinese New Communications, Oct. 2013, Translation dated Aug. 6, 2019, 1 page.
Foreign Communication From a Counterpart Application, Chinese Application No. 201680003123.8, Chinese Office Action dated Jul. 18, 2019, 9 pages.
Foreign Communication From a Counterpart Application, European Application No. 16897557.1, Extended European Search Report dated Feb. 20, 2019, 7 pages.
Machine Translation and Abstract of Chinese Publication No. CN103902465, Jul. 2, 2014, 24 pages.
Machine Translation and Abstract of Chinese Publication No. CN103135946, Jun. 5, 2013, 14 pages.
Machine Translation and Abstract of Chinese Publication No. CN104794070, Jul. 22, 2015, 18 pages.
Foreign Communication From a Counterpart Application, PCT Application No. PCT/CN2016/078693, English Translation of International Search Report dated Dec. 26, 2016, 2 pages.

* cited by examiner

METHOD FOR PROCESSING STRIPE IN STORAGE DEVICE AND STORAGE DEVICE

CROSS-REFERENCE TO RELATED APPLICATIONS

This application is a continuation of International Application No. PCT/CN2016/078693, filed on Apr. 7, 2016, the disclosure of which is hereby incorporated by reference in its entirety.

TECHNICAL FIELD

Embodiments of the present disclosure relate to the computer storage field, and more specifically, to a method for processing a stripe in a storage device and a storage device.

BACKGROUND

A redundant array of independent disks (RAID) is a technology of combining multiple independent hard disks (physical hard disks) in different manners into a hard disk group (a logical hard disk). The RAID can provide higher storage performance and data backup performance than a single hard disk. Data in the RAID is distributed in a stripe form. A stripe may be understood as a group of location-related chunks in two or more partitions in the hard disk array. The chunk may also be referred to as a stripe unit (SU), that is, the stripe includes multiple SUs. One stripe includes an SU used to store data and a SU used to store parity data of the data.

In a RAID including solid state disks (SSD), when data in a stripe needs to be modified, a redirect on write (ROW) manner is usually used, that is, new data is written to a new idle address, and correspondingly, data at an original address becomes invalid data. When an invalid data amount in the stripe reaches a specific threshold, garbage collection (GC) on the stripe is triggered.

In conventional technologies, when garbage collection is performed on a stripe, all valid data in the stripe first needs to be migrated to another idle stripe, and then the stripe is reclaimed. This leads to a large data migration amount, which increases write operations on a storage device and causes relatively high performance overheads.

SUMMARY

Embodiments of the present disclosure provide a method for processing a stripe in a storage device and a storage device in order to effectively reduce a data migration amount in a scenario of performing garbage collection on a stripe, thereby reducing write operations and lowering performance overheads.

A first aspect provides a method for processing a stripe in a storage device, where the method includes determining at least two stripes in the storage device that satisfy a garbage collection condition, where each of the at least two stripes includes a SU requiring garbage collection and a SU not requiring garbage collection; determining at least one SU not requiring garbage collection from each stripe; computing parity data of data in the determined SUs not requiring garbage collection; and storing the parity data into a first idle SU, where the first SU and the determined SUs not requiring garbage collection are constructed into a new stripe in the storage device.

In this application, in a scenario of performing garbage collection on a stripe, the SUs that are in the at least two stripes and do not require garbage collection are constructed into the new stripe, and garbage collection processing is not performed on the new stripe. Correspondingly, there is no data migration operation. Therefore, in the scenario of performing garbage collection on a stripe, according to this application, a data migration amount can be effectively reduced, thereby reducing write operations on the storage device, and lowering performance overheads of the storage device.

In addition, in this application, parity data of data in the SUs that are in the at least two stripes and do not require garbage collection is written to the first idle SU, so that the first SU and the SUs not requiring garbage collection are constructed into the new stripe, instead of performing a large quantity of extra write operations to migrate data in the original SUs to an idle SU to construct the new stripe. Therefore, storage space utilization of the storage device can be improved to some extent.

In the foregoing implementation, the SU not requiring garbage collection is a SU whose invalid data amount is less than a first preset threshold in the stripe; correspondingly, the SU requiring garbage collection is a SU whose invalid data amount is greater than or equal to the first preset threshold in the stripe. Alternatively, the SU not requiring garbage collection may be a SU whose valid data amount is greater than a second preset threshold in the stripe; correspondingly, the SU requiring garbage collection is a SU whose valid data amount is less than or equal to the second preset threshold in the stripe. It should be understood that, different stripes may have same or different preset thresholds (the first preset threshold or the second preset threshold) used to determine whether a SU requires garbage collection. The invalid data amount used to determine whether a SU requires garbage collection may indicate a proportion of a size of invalid data in the SU to a size of all data in the SU, or may directly indicate the size of the invalid data in the SU. The valid data amount used to determine whether a SU requires garbage collection may indicate a proportion of a size of valid data in the SU to a size of all data in the SU, or may directly indicate the size of the valid data in the SU.

In the foregoing implementations, the garbage collection condition means a condition that a stripe in the storage device needs to satisfy when garbage collection is performed on the stripe. Further, the garbage collection condition may mean that an invalid data amount in a stripe reaches a garbage collection threshold, or the garbage collection condition may mean that one or more SUs in a stripe become abnormal, for example, there is a lack of a corresponding physical hard disk data block.

It should be understood that, when the garbage collection condition is that one or more SUs in a stripe become abnormal, the SU requiring garbage collection is an abnormal SU, and the SU not requiring garbage collection is a normal SU.

With reference to the first aspect, in a first possible implementation of the first aspect, the method further includes, when the SU requiring garbage collection includes valid data, migrating the valid data in the SU requiring garbage collection to a second idle SU in the storage device, and reclaiming the SU requiring garbage collection; when the SU requiring garbage collection includes no valid data, reclaiming the SU requiring garbage collection.

In this application, for the SU requiring garbage collection, when the SU includes valid data, the valid data is first migrated to an idle SU, and then the SU is reclaimed; when the SU includes no valid data, the SU can be directly reclaimed.

With reference to the first aspect or the first possible implementation of the first aspect, in a second possible implementation of the first aspect, a size of the new stripe is the same as a size of each of the at least two stripes; or a size of the new stripe is the same as a size of at least one of the at least two stripes; or a size of the new stripe is different from a size of each of the at least two stripes.

With reference to the first aspect or the first or second possible implementation of the first aspect, in a third possible implementation of the first aspect, the new stripe is a stripe generated based on RAID technology.

With reference to the first aspect or the first or second possible implementation of the first aspect, in a fourth possible implementation of the first aspect, the new stripe is a stripe generated based on EC technology.

With reference to the first possible implementation of the first aspect, in a fifth possible implementation of the first aspect, the method further includes releasing a mapping relationship between a logical unit number (LUN) and the SU requiring garbage collection.

It should be understood that, when the SU requiring garbage collection includes valid data, the method further includes establishing a mapping relationship between the LUN and the second SU.

A second aspect provides a storage device, where the storage device is configured to perform the method in the first aspect or any possible implementation of the first aspect.

Further, the storage device may include modules configured to perform the method in the first aspect or any possible implementation of the first aspect.

A third aspect provides a storage device, where the storage device includes a controller and multiple stripes, and the controller is configured to determine, in the multiple stripes, at least two stripes that satisfy a garbage collection condition, where each of the at least two stripes includes a SU requiring garbage collection and a SU not requiring garbage collection; determine at least one SU not requiring garbage collection from each stripe; compute parity data of data in the determined SUs not requiring garbage collection; and store the computed parity data into a first idle SU, where the determined SUs not requiring garbage collection and the first SU are constructed into a new stripe in the storage device.

In this application, in a scenario of performing garbage collection on a stripe, the SUs that are in the at least two stripes and do not require garbage collection are constructed into the new stripe, and garbage collection processing is not performed on the new stripe. Correspondingly, there is no data migration operation. Therefore, in the scenario of performing garbage collection on a stripe, according to this application, a data migration amount can be effectively reduced, thereby reducing write operations on the storage device, and lowering performance overheads of the storage device.

In addition, in this application, parity data of data in the SUs that are in the at least two stripes and do not require garbage collection is written to the first idle SU, so that the first SU and the SUs not requiring garbage collection are constructed into the new stripe, instead of performing a large quantity of extra write operations to migrate data in the original SUs to an idle SU to construct the new stripe. Therefore, storage space utilization of the storage device can be improved to some extent.

With reference to the third aspect, in a first possible implementation of the third aspect, the controller is further configured to, when the SU requiring garbage collection includes valid data, migrate the valid data in the SU requiring garbage collection to a second idle SU in the storage device, erase data in the SU requiring garbage collection, and reclaim the SU requiring garbage collection; and when the SU requiring garbage collection includes no valid data, erase data in the SU requiring garbage collection, and reclaim the SU requiring garbage collection.

Further, in implementations of the third aspect, the controller includes a processor and a memory, and the processor executes a computer instruction in the memory to implement the implementations (operations) of the third aspect. A person skilled in the art may know that, another implementation may also implement the implementations (operations) of the controller in the embodiments of the present disclosure. For example, a field-programmable gate array (FPGA) or other hardware is used to perform all the implementations (operations) of the controller in the embodiments of the present disclosure, or the processor and an FPGA or other hardware separately perform some implementations of the controller in the embodiments of the present disclosure, to implement the implementations of the controller described in the embodiments of the present disclosure.

In the implementations of the third aspect, a stripe is a result of striping management on storage space in the storage device by the controller.

Correspondingly, a fourth aspect provides a non-volatile storage medium, where the non-volatile storage medium stores a computer instruction, and the processor in the implementations of the third aspect executes the computer instruction, to implement the implementations (operations) of the third aspect.

Based on the foregoing implementations, in this application, in a scenario of performing garbage collection on a stripe, the SUs that are in the at least two stripes and do not require garbage collection are constructed into the new stripe, and garbage collection processing is not performed on the new stripe. Correspondingly, there is no data migration operation. Therefore, in the scenario of performing garbage collection on a stripe, according to this application, a data migration amount can be effectively reduced, thereby reducing write operations on the storage device, and lowering performance overheads of the storage device.

BRIEF DESCRIPTION OF DRAWINGS

To describe the technical solutions in the embodiments of the present disclosure more clearly, the following briefly describes the accompanying drawings required for describing the embodiments or the prior art.

DESCRIPTION OF EMBODIMENTS

The following clearly describes the technical solutions in the embodiments of the present disclosure with reference to the accompanying drawings in the embodiments of the present disclosure.

A method for processing a stripe in a storage device provided in the embodiments of the present disclosure may be applied to a storage device that performs stripe-based management, for example, a storage array including SSDs, or an SSD, or a storage array including shingled magnetic recording (SMR) disks.

Figure 1:
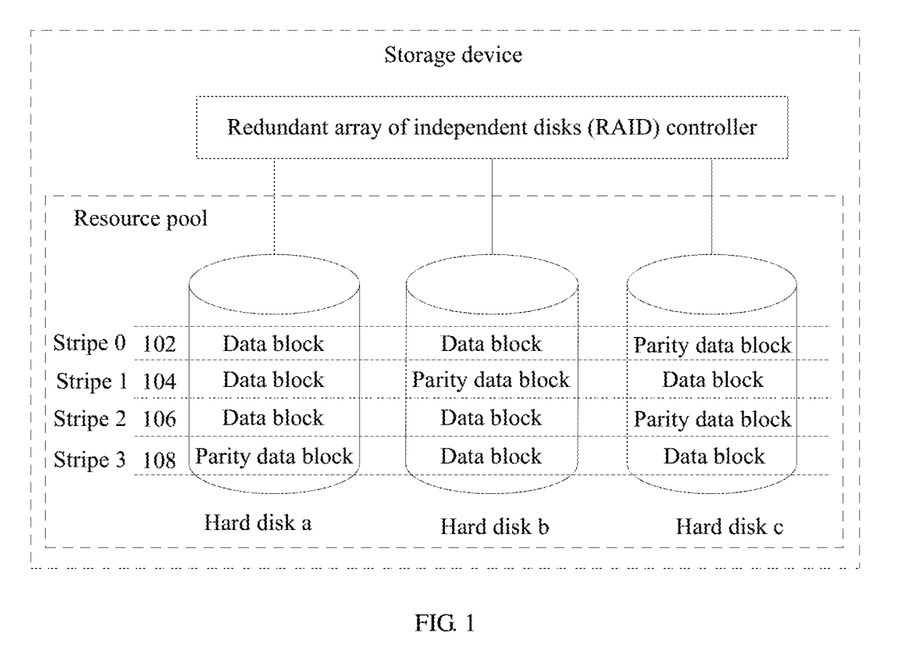
FIG. 1 is a schematic diagram of stripes in the prior art.

Striping is a method for combining multiple hard disks (or multiple storage media in a single disk) into one volume. A stripe may be understood as a group of location-related chunks in two or more partitions in a hard disk array (or a hard disk). The chunk may also be referred to as an SU, that is, the stripe includes multiple SUs. The stripe is a result of striping management on storage space. For details, refer to an understanding of the stripe by a person skilled in the art. Each SU corresponds to a block in a hard disk. For example, as shown in FIG. 1, a stripe 0 includes three SUs, and the three SUs respectively correspond to a data block in a hard disk a, a data block in a hard disk b, and a parity data block in a hard disk c that are in a row denoted by 102 in FIG. 1. A stripe 1 includes three SUs, and the three SUs respectively correspond to a data block in the hard disk a, a parity data block in the hard disk b, and a data block in the hard disk c that are in a row denoted by 104 in FIG. 1. A stripe 2 includes three SUs, and the three SUs respectively correspond to a data block in the hard disk a, a data block in the hard disk b, and a parity data block in the hard disk c that are in a row denoted by 106 in FIG. 1. A stripe 3 includes three SUs, and the three SUs respectively correspond to a parity data block in the hard disk a, a data block in the hard disk b, and a data block in the hard disk c that are in a row denoted by 108 in FIG. 1.

By way of example and not limitation, a storage device shown in FIG. 1 is, for example, an SSD storage array. For example, the hard disks a, b, and c shown in FIG. 1 are all SSDs. For ease of understanding and description, the following is described based on an example in which the embodiments of the present disclosure are applied to an SSD-based storage device. However, according to instructions in the embodiments of the present disclosure, a person skilled in the art may clearly understand that, the method in the embodiments of the present disclosure may also be applied to another storage device that performs stripe-based management, and such applications all fall within the protection scope of the present disclosure.

The SSD is a new storage system that uses a flash memory as a storage medium. The flash memory does not have a mechanical part like a magnetic head, and has equivalent overheads in a random access mode and a sequential access mode. Therefore, the SSD has a large performance advantage over a conventional hard disk. The flash memory has to be erased before being written. For example, when data in the flash memory needs to be updated, before an old value of the data is erased, a new value of the data cannot be written to a physical address at which the old value of the data is located, that is, the old value of the data needs to be erased first, and the new value of the data can be then written to the physical address at which the old value of the data is located. However, the flash memory has another characteristic: A page is used as a unit for read and write operations, and a block (including multiple pages) is used as a unit for an erase operation. In other words, when the new value of the data needs to be written to the physical address at which the old value of the data is located, data in an entire block (usually 64 kilobyte (KB) or 128 KB) in which the old value of the data is located needs to be erased, and the new value of the data can be then written to the block that is in an erased state. However, first, block erasure is much more costly, because although a block in the flash memory can be erased repeatedly, each block has a limited quantity of erasing times, and a service life of the flash memory is calculated according to the quantity of erasing times. For example, a multi-level cell (MLC) flash memory generally has a service life of 1,000 to 10,000 times, and a single-level cell (SLC) flash memory has a service life of about 100,000 times. Second, when a to-be-erased block further includes valid data, before the block is erased, the valid data first needs to be read and then written to a new block address. Such a process is referred to as data migration. Data migration causes write amplification (WA), that is, an amount of data actually written is greater than an amount of data that needs to be written to the SSD. Write amplification is an unwanted phenomenon. To resolve the foregoing problems, in the prior art, a ROW manner is usually used, that is, in a case of data overwriting, to-be-written data is redirected and written to a new idle address, and correspondingly, data at an original address becomes invalid data.

As shown in FIG. 1, a storage array including SSDs has a controller and SSDs (it is assumed that hard disks shown in FIG. 1 are all SSDs) connected to the controller. The controller is configured to divide the SSDs into multiple stripes (for example, the stripe 0, the stripe 1, the stripe 2, and the stripe 3 shown in FIG. 1), and then provide logical unit number (LUN) for a host based on the stripes. The LUN may be considered as a logical hard disk accessible to the host, may also be referred to as a logical space unit, and is also space in which a user can read and write. As shown in FIG. 1, one stripe includes multiple SUs, and each SU corresponds to a block. It should be understood that, when the host performs a write operation in the LUN, corresponding data is written to an SU, and correspondingly written to a corresponding block. When garbage collection is performed on the stripe, a corresponding block is also reclaimed, that is, the corresponding block is erased, and storage space of the block is released.

Further, the controller shown in FIG. 1 is, for example, a RAID controller, and the stripe 0, the stripe 1, the stripe 2, and the stripe 3 shown in FIG. 1 are all stripes constructed based on a RAID technology.

Figure 2:
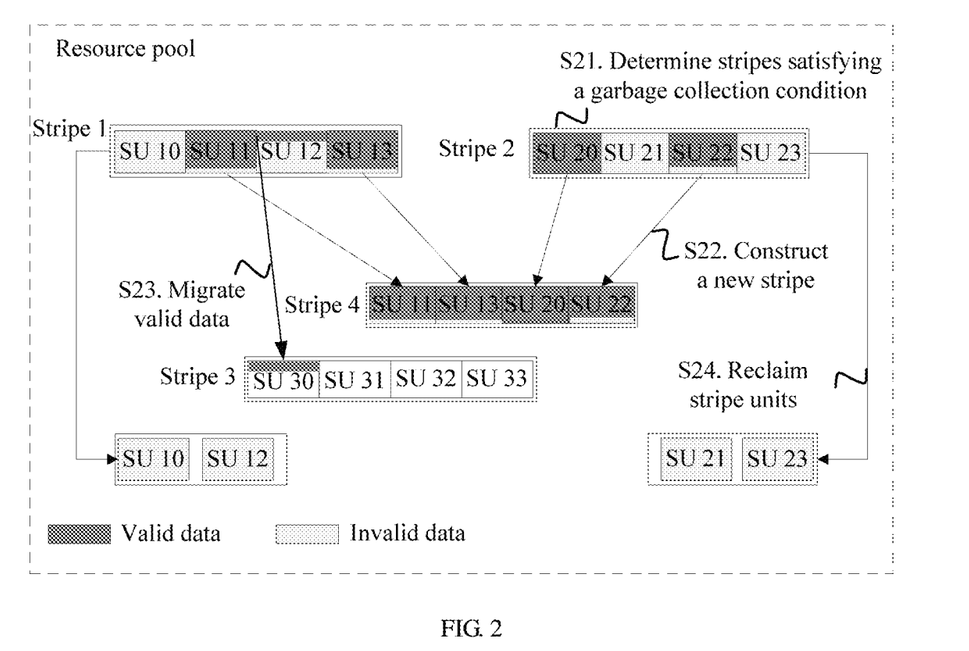
FIG. 2 is a schematic diagram of a method for processing a stripe in a storage device according to an embodiment of the present disclosure.

FIG. 2 is a schematic diagram of a garbage collection method for a storage device according to an embodiment of the present disclosure.

S21. Determine two stripes: a stripe 1 and a stripe 2 in the storage device that satisfy a garbage collection condition. The stripe 1 and the stripe 2 each include an SU (for example, an SU 10 and an SU 12 in the stripe 1, and an SU 21 and an SU 23 in the stripe 2) requiring garbage collection and an SU (for example, an SU 11 and an SU 13 in the stripe 1, and an SU 20 and an SU 22 in the stripe 2) not requiring garbage collection.

Further, for example, invalid data is generated in the stripe 1 and the stripe 2 due to a data overwriting operation. For example, a user needs to update data stored in the SU 10 of the stripe 1, and writes updated data of the data stored in the SU 10 to another blank address; as a result, the data stored in the SU 10 becomes invalid data. When an invalid data amount in each of the stripe 1 and the stripe 2 reaches a garbage collection threshold, a garbage collection operation on the stripe 1 and the stripe 2 is triggered. As shown in FIG. 2, invalid data amounts of the SUs in the stripe 1 and the stripe 2 are unbalanced, the SU 10 and the SU 12 in the stripe 1 are determined as SUs requiring garbage collection, the SU 11 and the SU 13 in the stripe 1 are determined as SUs not requiring garbage collection, the SU 21 and the SU 23 in the stripe 2 are determined as SUs requiring garbage collection, and the SU 20 and the SU 22 in the stripe 2 are determined as SUs not requiring garbage collection.

S22. Construct the SU 11 and the SU 13 in the stripe 1 that do not require garbage collection and the SU 20 and the SU 22 in the stripe 2 that do not require garbage collection into a new stripe (for example, a stripe 4 shown in FIG. 2).

Further, parity data of data in the SU 11, the SU 13, the SU 20, and the SU 22 is computed, and the parity data is stored into an idle SU (the SU storing the parity data is not shown in FIG. 2), so that the SU 11, the SU 13, the SU 20, and the SU 22 together with the SU storing the parity data are constructed into the new stripe 4 (the SU, storing the parity data, in the stripe 4 is not shown in FIG. 2).

Optionally, in this embodiment of the present disclosure, the constructed new stripe (the stripe 4) is a stripe generated based on a RAID technology or an erasure coding (EC) technology.

It should be understood that the stripe generated based on the RAID technology means that an SU storing data and an SU storing parity data in the stripe conform to a particular RAID level relationship, for example, a RAID 5, a RAID 6, or a RAID 10 is formed. The stripe generated based on the EC technology means that the parity data stored in the stripe is obtained by computing data in the SU 11, the SU 13, the SU 20, and the SU 22 based on a particular EC algorithm, so that the SU storing the parity data, the SU 11, the SU 13, the SU 20, and the SU 22 are constructed into the new stripe.

S23. Migrate valid data in the SU 12, requiring garbage collection, in the stripe 1 to an idle stripe (for example, a stripe 3 shown in FIG. 2). It should be understood that the idle stripe may be a stripe not written with data, or may be a stripe not fully written with data.

S24. Erase data in the SU 10, the SU 12, the SU 21, and the SU 23, and then release storage space of the SU 10, the SU 12, the SU 21, and the SU 23, that is, reclaim the SU 10, the SU 12, the SU 21, and the SU 23.

Therefore, in this embodiment of the present disclosure, in a scenario of performing garbage collection on a stripe, the SUs that are in the at least two stripes and do not require garbage collection are constructed into the new stripe, and the new stripe is not reclaimed, so that a data migration amount can be reduced, thereby reducing write operations on the storage device, and lowering performance overheads of the storage device. In addition, parity data of data in the SUs that are in the at least two stripes and do not require garbage collection is written to a first idle SU, so that the first SU and the SUs not requiring garbage collection are constructed into the new stripe, instead of performing a large quantity of extra write operations to migrate data in the original SUs to an idle SU to construct the new stripe. Therefore, storage space utilization of the storage device can be improved to some extent.

Further, in S21, the stripe 1 and the stripe 2 in the storage device that satisfy the garbage collection condition are determined. The garbage collection condition may mean that an invalid data amount in a stripe reaches a garbage collection threshold. For example, when a proportion of an invalid data amount in the stripe 1 shown in FIG. 2 in a total data amount in the stripe 1 reaches 80% (it is assumed that the garbage collection threshold is 80%), garbage collection processing on the stripe 1 is triggered.

When the garbage collection condition is that an invalid data amount in a stripe reaches a garbage collection threshold, an SU requiring garbage collection is an SU whose invalid data amount is greater than or equal to the preset threshold in the stripe; and an SU not requiring garbage collection is an SU whose invalid data amount is less than the preset threshold in the stripe. Different stripes may have same or different preset thresholds used to determine whether an SU requires garbage collection.

Optionally, the garbage collection condition may mean that one or more SUs in a stripe become abnormal, for example, there is a lack of a corresponding physical hard disk data block. When a disk in which a block corresponding to an SU in a stripe is located is faulty, or a block corresponding to an SU in a stripe is unavailable, this stripe satisfies the garbage collection condition, and requires garbage collection.

When the garbage collection condition indicates that one or more SUs in a stripe become abnormal, an SU requiring garbage collection is the abnormal SU, and an SU not requiring garbage collection is a normal SU.

Therefore, in this embodiment of the present disclosure, only the abnormal SU in the stripe is reclaimed, and the normal SU in the stripe and a normal SU in another stripe are constructed into a new stripe, so that a data migration amount is reduced, thereby effectively reducing write operations on the storage device, and lowering performance overheads of the storage device.

In S22, the SU 11 and the SU 13, not requiring garbage collection, in the stripe 1, and the SU 20 and the SU 22, not requiring garbage collection, in the stripe 2 are constructed into the new stripe (for example, the stripe 4 shown in FIG. 2). Optionally, in this embodiment of the present disclosure, a size of the new stripe is the same as a size of the stripe 1 or the stripe 2; or a size of the new stripe is the same as a size of one of the stripe 1 and the stripe 2; or a size of the new stripe is different from a size of each of the stripe 1 and the stripe 2.

It should be understood that a size of a stripe is a sum of capacities of data that can be written by an array (for example, a RAID shown in FIG. 1) to a group of parallel hard disks.

It should be understood that steps S23 and S24 may be collectively referred to as a process of performing garbage collection on a SU requiring garbage collection.

Optionally, in this embodiment of the present disclosure, when the SU requiring garbage collection includes valid data, the valid data in the SU requiring garbage collection is migrated to a second idle SU in the storage device, data in the SU requiring garbage collection is erased, and the SU requiring garbage collection is reclaimed; or when the SU requiring garbage collection includes no valid data, data in the SU requiring garbage collection is erased, and the SU requiring garbage collection is reclaimed.

Further, for example, in a scenario shown in FIG. 2 because the SU 12, requiring garbage collection, in the stripe 1 includes valid data, before the SU 12 is reclaimed, the valid data in the SU 12 first needs to be migrated to another idle stripe (for example, the stripe 3 shown in FIG. 3), and the SU 12 can be then reclaimed, that is, data in the SU 12 is erased, and storage space corresponding to the SU 12 is released. The SU 10, requiring garbage collection, in the stripe 1, and the SU 21 and the SU 23, requiring garbage collection, in the stripe 2 include no valid data, and all data is invalid data. Therefore, the SU 10, the SU 21, and the SU 23 can be directly reclaimed. That is, data in the SU 10, the SU 12, the SU 21, and the SU 23 is erased, and storage space corresponding to the SU 10, the SU 12, the SU 21, and the SU 23 is released. In other words, for the SU 12 requiring garbage collection, both steps S23 and S24 need to be performed; however, for the SU 10, the SU 21, and the SU 23 requiring garbage collection, S23 does not need to be performed, and S24 is directly performed.

Optionally, in S23, valid data in an SU, whose invalid data amount is greater than the preset threshold, in the stripe 1 and the stripe 2 is migrated to an idle SU. The idle SU may be an SU not written with data, or may be an SU not full written with data.

Optionally, in this embodiment of the present disclosure, a valid data amount and an invalid data amount in an SU may be determined according to a bitmap of the SU in order to determine whether the SU requires garbage collection. It should be understood that the bitmap of the SU is used to identify which data in the SU is valid. For example, if the SU has a space size of 1 MB, and a minimum management granularity of the SU (that is, a data address granularity of the SU) is 4 KB, the bitmap of the SU includes 1 MB/4 KB=256 bits. For example, a bit corresponding to invalid data is set to "0", and a bit corresponding to valid data is set to "1". In this way, which data in the SU is valid and which data in the SU is invalid can be distinguished based on bit information in the bitmap of the SU, and the valid data amount and the invalid data amount in the SU can be determined.

Further, in S22, according to a disk ID bound to an ID of the SU 11 in the stripe 1, the ID of the SU 11 is added to a linked list of a disk corresponding to the disk ID, and a similar action is performed for each to-be-reconstructed SU. A disk ID bound to an ID of the SU storing the parity data of the data in the SU 11, the SU 13, the SU 20, and the SU 22 is added to a linked list corresponding to the disk ID. A new stripe ID (that is, the stripe 4) is allocated to the SU 11, the SU 13, the SU 20, the SU 22, and the SU that stores the parity data of the data in the SU 11, the SU 13, the SU 20, and the SU 22, and a binding relationship between the new stripe ID and SU IDs in these linked lists of different disks is established.

It should be understood that a size of a stripe is a quantity of SUs included in the stripe, and may be a fixed value, or may be a variable in accordance with a policy of the storage device. For example, for a stripe generated based on the RAID technology, the stripe may include different quantities of SUs according to different RAID levels.

It should be further understood that, when a LUN includes the stripe 1 and the stripe 2, after the storage device performs migration processing and reconstruction processing, the storage device releases a previous mapping relationship between the LUN and each of the SU 10 and the SU 12 in the stripe 1 and the SU 21 and the SU 23 in the stripe 2, and establishes a mapping between the LUN and the SU that stores the parity data of the data in the SU 11, the SU 13, the SU 20, and the SU 22.

It should be further understood that, after the storage device performs garbage collection on the SU 10, the SU 12, the SU 21, and the SU 23, new data can be written to the SU 10, the SU 12, the SU 21, and the SU 23.

Therefore, in this embodiment of the present disclosure, in a scenario of performing garbage collection on a stripe, the SUs, not requiring garbage collection, in the at least two stripes are constructed into the new stripe, instead of migrating valid data in each SU in the stripes, so that data migration is reduced, and performance overheads of the storage device are lowered. In addition, parity data of data in the SUs that are in the at least two stripes and do not require garbage collection is written to the first idle SU, so that the first SU and the SUs not requiring garbage collection are constructed into the new stripe, instead of performing a large quantity of extra write operations to migrate data in the original SUs to an idle SU to construct the new stripe. Therefore, storage space utilization of the storage device can be improved to some extent.

By way of example and not limitation, FIG. 2 shows a case in which two stripes satisfying the garbage collection condition are processed. This embodiment of the present disclosure is not limited thereto. For example, three or more stripes satisfying the garbage collection condition may be processed based on the method provided in this embodiment of the present disclosure.

With reference to FIG. 2, a redirect-on-write storage system is used above as an example to describe the method for processing a stripe in a storage device provided in this embodiment of the present disclosure. It should be understood that the application scope of the method for processing a stripe in a storage device provided in this embodiment of the present disclosure is not limited only to a scenario in which invalid data is caused due to redirect-on-write. The method for processing a stripe in a storage device provided in this embodiment of the present disclosure can be applied, provided that invalid data is produced in a stripe and requires garbage collection.

Figure 3:
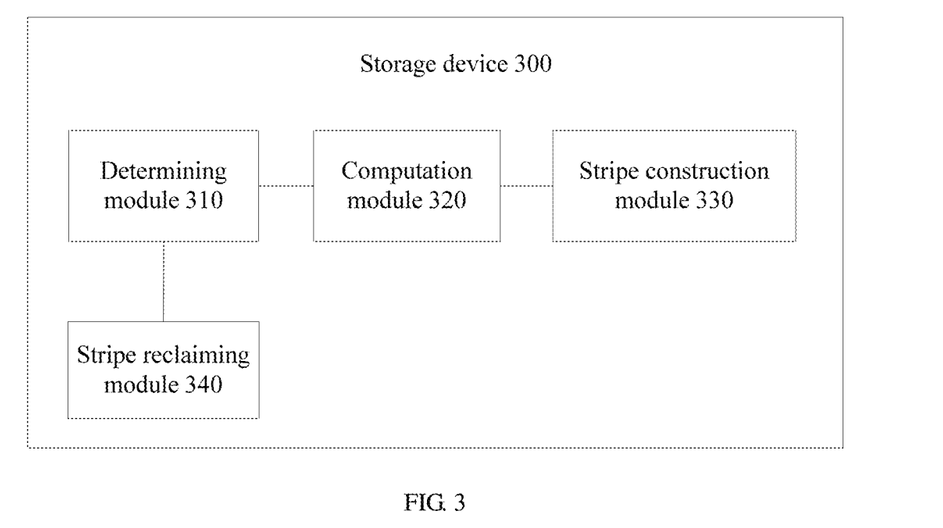
FIG. 3 is a schematic block diagram of a storage device according to an embodiment of the present disclosure.

FIG. 3 is a schematic block diagram of a storage device 300 according to an embodiment of the present disclosure. The storage device 300 includes a determining module 310 configured to determine at least two stripes in the storage device that satisfy a garbage collection condition, where each of the at least two stripes includes a SU requiring garbage collection and a SU not requiring garbage collection, where the determining module 310 is further configured to determine at least one SU not requiring garbage collection from each stripe; a computation module 320 configured to compute parity data of data in the SUs that do not require garbage collection and are determined by the determining module; and a stripe construction module 330 configured to store the parity data into a first idle SU, where the first SU and the determined SUs not requiring garbage collection are constructed into a new stripe in the storage device.

Therefore, in this embodiment of the present disclosure, in a scenario of performing garbage collection on a stripe, the SUs that are in the at least two stripes and do not require garbage collection are constructed into the new stripe, and garbage collection processing is not performed on the new stripe. Correspondingly, there is no data migration operation. Therefore, in the scenario of performing garbage collection on a stripe, according to this application, a data migration amount can be effectively reduced, thereby reducing write operations on the storage device, and lowering performance overheads of the storage device.

Optionally, in this embodiment of the present disclosure, the device 300 further includes a stripe reclaiming module 340 configured to, when the SU requiring garbage collection includes valid data, migrate the valid data in the SU requiring garbage collection to a second idle SU in the storage device, and reclaim the SU requiring garbage collection.

The stripe reclaiming module 340 is further configured to, when the SU requiring garbage collection includes no valid data, reclaim the SU requiring garbage collection.

In this embodiment of the present disclosure, for the SU requiring garbage collection, when the SU includes valid data, the valid data is first migrated to an idle SU, and then the SU requiring garbage collection is reclaimed; when the SU includes no valid data, the SU can be directly reclaimed.

Optionally, in this embodiment of the present disclosure, the new stripe is a stripe generated based on a redundant array of hard disks (RAID) technology.

Optionally, in this embodiment of the present disclosure, the new stripe is a stripe generated based on an erasure coding (EC) technology.

It should be understood that the foregoing and other operations and/or functions of the modules in the device 300 for processing invalid data according to this embodiment of the present disclosure are separately used to implement corresponding procedures of the method shown in FIG. 2. For brevity, details are not described herein again.

Figure 4:
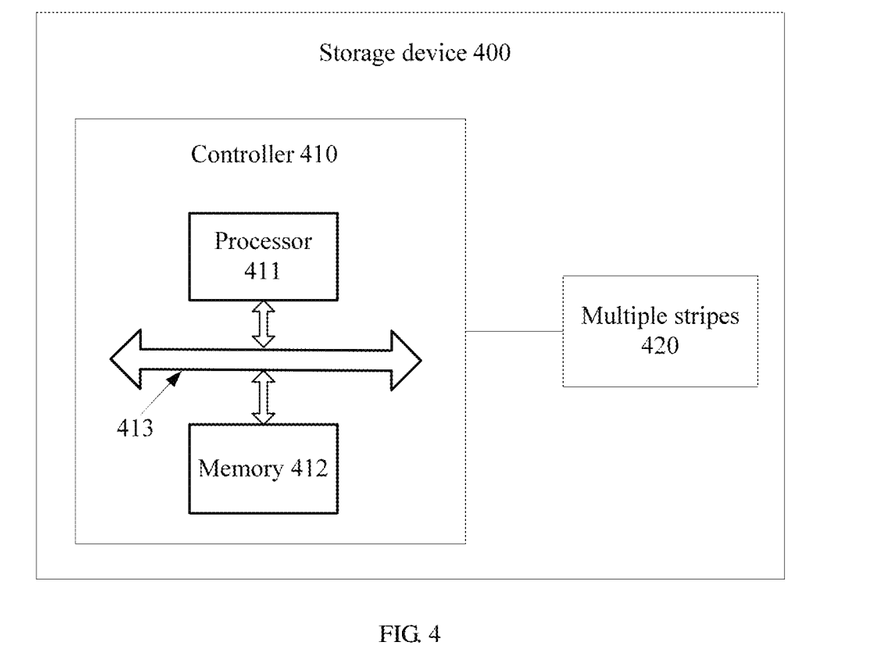
FIG. 4 is another schematic block diagram of a storage device according to an embodiment of the present disclosure.

As shown in FIG. 4, an embodiment of the present disclosure further provides a storage device 400. The storage device 400 includes a controller 410 and multiple stripes 420. Further, the controller 410 includes a processor 411, a memory 412, and a bus system 413. The processor 411 is connected to the memory 412 based on the bus system 413. The memory 412 is configured to store a computer instruction. The processor 411 is configured to execute the computer instruction stored in the memory 412. The following operations performed by the controller 410 are implemented by executing the computer instruction stored in the memory 412. A person skilled in the art may know that the controller 410 in this embodiment of the present disclosure may be implemented in another implementation. For example, a field programmable gate array (Field Programmable Gate Array, FPGA) or other hardware is used to perform all operations of the controller 410 in this embodiment of the present disclosure, or the processor 411 and an FPGA or other hardware separately perform some operations of the controller 410 in this embodiment of the present disclosure, to implement the operations of the controller 410 described in this embodiment of the present disclosure. The controller 410 is configured to determine, in the multiple stripes 420, at least two stripes that satisfy a garbage collection condition, where each of the at least two stripes includes a SU requiring garbage collection and a SU not requiring garbage collection; determine at least one SU not requiring garbage collection from each stripe; compute parity data of data in the determined SUs not requiring garbage collection; and store the computed parity data into a first idle SU, where the determined SUs not requiring garbage collection and the first SU are constructed into a new stripe in the storage device.

It should be understood that the multiple stripes 420 may correspond to multiple stripes (the stripe 0, the stripe 1, the stripe 2, and the stripe 3) in a resource pool shown in FIG. 1.

The stripe is a result of striping management on storage space in the storage device by the controller. For details, refer to an understanding of the stripe by a person skilled in the art.

In this embodiment of the present disclosure, in a scenario of performing garbage collection on a stripe, the SUs that are in the at least two stripes and do not require garbage collection are constructed into the new stripe, and garbage collection processing is not performed on the new stripe. Correspondingly, there is no data migration operation. Therefore, in the scenario of performing garbage collection on a stripe, according to this application, a data migration amount can be effectively reduced, thereby reducing write operations on the storage device, and lowering performance overheads of the storage device.

In addition, in this embodiment of the present disclosure, parity data of data in the SUs that are in the at least two stripes and do not require garbage collection is written to the first idle SU, so that the first SU and the SUs not requiring garbage collection are constructed into the new stripe, instead of performing a large quantity of extra write operations to migrate data in the original SUs to an idle SU to construct the new stripe. Therefore, storage space utilization of the storage device can be improved to some extent.

Optionally, in this embodiment of the present disclosure, the processor 411 is further configured to, when the SU requiring garbage collection includes valid data, migrate the valid data in the SU requiring garbage collection to a second idle SU in the storage device, erase data in the SU requiring garbage collection, and reclaim the SU requiring garbage collection; and when the SU requiring garbage collection includes no valid data, erase data in the SU requiring garbage collection, and reclaim the SU requiring garbage collection.

Optionally, in this embodiment of the present disclosure, the stripe in the storage device 400 is generated based on a redundant array of hard disks RAID technology or an erasure coding EC technology.

Therefore, in this embodiment of the present disclosure, in a scenario of performing garbage collection on a stripe, the SUs that are in the at least two stripes and do not require garbage collection are constructed into the new stripe, and garbage collection processing is not performed on the new stripe. Correspondingly, there is no data migration operation. Therefore, in the scenario of performing garbage collection on a stripe, according to this application, a data migration amount can be effectively reduced, thereby reducing write operations on the storage device, and lowering performance overheads of the storage device.

It should be understood that the storage device 400 according to this embodiment of the present disclosure corresponds to the storage device 300 provided in the foregoing embodiment of the present disclosure, and the storage device 400 is configured to implement corresponding procedures of the method shown in FIG. 2. For brevity, details are not described herein again.

It should be understood that sequence numbers of the foregoing processes do not mean execution sequences in various embodiments of the present disclosure. The execution sequences of the processes should be determined according to functions and internal logic of the processes, and should not be construed as any limitation on the implementation processes of the embodiments of the present disclosure.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present disclosure.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented based on some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments.

In addition, functional units in the embodiments of the present disclosure may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of the present disclosure essentially, or the part contributing to the prior art, or some of the technical solutions may be implemented in a form of a software product. The software product is stored in a storage medium, and includes several instructions for instructing a computer device (which may be a personal computer, a server, or a network device) to perform all or some of the steps of the methods described in the embodiments of the present disclosure. The foregoing storage medium includes any medium that can store program code, such as a USB flash drive, a removable hard disk, a read-only memory (ROM), a random access memory (RAM), a magnetic disk, or an optical disc.

The foregoing descriptions are merely specific implementations of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A method, implemented by a storage device comprising a plurality of stripes, wherein the method comprises:
    determining stripe units in the plurality of stripes not requiring garbage collection and stripe units in the plurality of stripes requiring garbage collection;
    computing parity data of data in the stripe units in the plurality of stripes not requiring garbage collection;
    storing the parity data into a first idle stripe unit;
    recording the first idle stripe unit and the stripe units in the plurality of stripes not requiring garbage collection in a new stripe in the storage device without migrating the data of the stripe units not requiring garbage collection; and
    reclaiming the stripe units in the plurality of stripes requiring garbage collection.

2. The method of claim 1, further comprising migrating valid data in at least one of the stripe units in the plurality of stripes requiring garbage collection to a second idle stripe in the storage device.

3. The method of claim 1, wherein the new stripe is a stripe generated based on a redundant array of independent disks (RAID) technology.

4. The method of claim 1, wherein the new stripe is a stripe generated based on an erasure coding (EC) technology.

5. A storage device comprising:
    a plurality of stripes; and
    a controller at least partially implemented in hardware, wherein the controller is configured to:
        determine stripe units in the plurality of stripes not requiring garbage collection and stripe units in the plurality of stripes requiring garbage collection;
        compute parity data of data in the stripe units in the plurality of stripes not requiring garbage collection;
        store the parity data into a first idle stripe unit;
        record the first idle stripe unit and the stripe units in the plurality of stripes not requiring garbage collection in a new stripe in the storage without migrating the data of the stripe units not requiring garbage collection; and
        reclaim the stripe units in the plurality of stripes requiring garbage collection.

6. The storage device of claim 5, wherein the controller is further configured to migrate valid data in at least one of the stripe units in the plurality of stripes requiring garbage collection to a second idle stripe in the storage device.

7. The storage device of claim 5, wherein the new stripe is a stripe generated based on a redundant array of independent disks (RAID) technology.

8. The storage device of claim 5, wherein the new stripe is a stripe generated based on an erasure coding (EC) technology.

9. A nonvolatile computer readable storage medium comprising instructions which, when executed by one or more processors of a storage device, cause the one or more processors to:
    determine stripe units in a plurality of stripes not requiring garbage collection and stripe units in the plurality of stripes requiring garbage collection;
    compute parity data of data in the stripe units in the plurality of stripes not requiring garbage collection;
    store the parity data into a first idle stripe unit;
    record the first idle stripe unit and the stripe units in the plurality of stripes not requiring garbage collection in a new stripe in the storage device without migrating the data of the stripe units not requiring garbage collection; and
    reclaim the stripe units in the plurality of stripes requiring garbage collection.

10. The nonvolatile computer readable storage medium of claim 9, wherein the instructions further cause the one or more processors to migrate valid data in at least one of the stripe units in the plurality of stripes requiring garbage collection to a second idle stripe.

11. The nonvolatile computer readable storage medium of claim 9, wherein the new stripe is a stripe generated based on a redundant array of independent disks (RAID) technology.

12. The nonvolatile computer readable storage medium of claim 9, wherein the new stripe is a stripe generated based on an erasure coding (EC) technology.

13. The storage device of claim 5, wherein each of the stripe units in the plurality of stripes not requiring garbage collection comprises an amount of invalid data below a first threshold.

14. The storage device of claim 13, wherein each of the stripe units in the plurality of stripes requiring garbage collection comprises an amount of invalid data above the first threshold.

15. The method of claim 1, wherein each of the stripe units in the plurality of stripes not requiring garbage collection comprises an amount of invalid data below a first threshold.

16. The method of claim 15, wherein each of the stripe units in the plurality of stripes requiring garbage collection comprises an amount of invalid data above the first threshold.

17. The nonvolatile computer readable storage medium of claim 9, wherein each of the stripe units in the plurality of stripes not requiring garbage collection comprises an amount of invalid data below a first threshold.

18. The nonvolatile computer readable storage medium of claim 17, wherein each of the stripe units in the plurality of stripes requiring garbage collection comprises an amount of invalid data above the first threshold.

19. The method of claim 1, wherein each of the plurality of stripes is an equal size.

20. The method of claim 1, wherein the storage device comprises at least one solid state disk (SSD).

* * * * *